(12) United States Patent
Kwon (10) Patent No.: US 6,431,124 B2
(45) Date of Patent: Aug. 13, 2002

(54) INSTANT PORTABLE HOT WATER MAKING BOTTLE

(75) Inventor: Yun Sang Kwon, 11-1 692 Bunji Shin Gil 7 Dong, Seoul (KR)

(73) Assignees: Yun Sang Kwon; PNT Technology Inc., both of Seoul (KR)

( * ) Notice: Subject to any disclaimer, the term of this patent is extended or adjusted under 35 U.S.C. 154(b) by 0 days.

(21) Appl. No.: 09/794,141

(22) Filed: Feb. 28, 2001

(30) Foreign Application Priority Data

Feb. 29, 2000 (KR) ............................ 2000-10147

(51) Int. Cl.⁷ ................................................ F24H 1/20
(52) U.S. Cl. ..................... 122/13.3; 122/40; 237/19; 392/447
(58) Field of Search ............................ 122/13.3, 22, 23, 122/31.1, 40; 237/19, 56, 57; 126/360.1, 360.2; 392/443, 444, 447

(56) References Cited

U.S. PATENT DOCUMENTS

| | | | | |
|---|---|---|---|---|
| 3,709,198 A | * | 1/1973 | Williams | 122/17.1 |
| 4,495,404 A | * | 1/1985 | Carmichael | 392/447 |
| 5,408,987 A | * | 4/1995 | Mifune et al. | 126/262 |
| 6,069,996 A | * | 5/2000 | Timm | 392/447 |
| 6,086,216 A | * | 7/2000 | Goldfarb | 362/101 |

\* cited by examiner

*Primary Examiner*—Gregory A. Wilson
(74) *Attorney, Agent, or Firm*—Birch, Stewart, Kolasch & Birch, LLP

(57) ABSTRACT

A portable vacuum insulated bottle includes a heat source having a minimum volume and a heat pipe which acts as a heat transmitting device. With this construction, a portable vacuum insulated bottle is provided which makes hot water instantly. In particular, a portable vacuum insulated bottle is provide which makes hot water using liquid propane gas as a possible heat source.

10 Claims, 7 Drawing Sheets

INSTANT PORTABLE HOT WATER MAKING BOTTLE

BACKGROUND OF THE INVENTION

1. Field of the Invention

The present invention relates to a hot water making bottle which makes liquid hot instantly. More specifically, the present invention relates to a portable hot water making bottle which makes liquid hot with heat that is transmitted from a heat source through a heat pipe which acts as a heat transmitting device. The heat transmitting device is installed inside the hot water making bottle and it operates by a simple button operation.

2. Description of the Background Art

Water is one of the most important sources and materials for human beings and human life. Water is essential for all activities in our lives such as traveling, sports, fishing, climbing, etc. In general, the temperature of water is similar to that of its surrounding environment. This is particularly true with drinking water. Therefore, natural mineral water is cold in the winter and warm in the summer. When in an environment where the temperature is below the normal body temperature, the need for hot or warm water is experienced in order to maintain the temperature of the body and get over the cold sensation.

Figure 1:
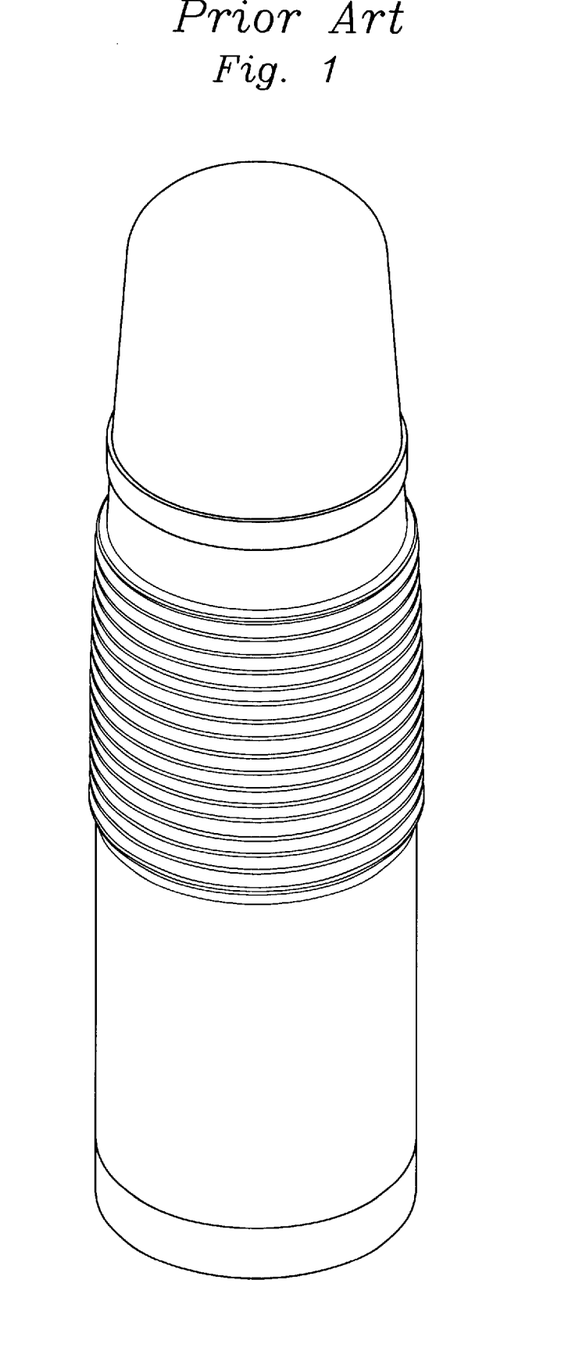
FIG. 1 shows a conventional portable vacuum insulated bottle which can contain hot water.

The most widely known and typical method of obtaining hot water when outside or away from a stove is to carry equipment such as a burner or kettle of some kind to make hot water, or to carry a vacuum insulated bottle filled with hot water (see FIG. 1). When hot water is needed during outdoor activities, it is troublesome since necessary equipment for making hot water must be carried in addition to the particular equipment needed for certain types of outdoor activities. It is not only inconvenient to carry all the necessary equipment just to get hot water, but it is also troublesome to obtain hot water when in an area where using flammable goods or making a fire is prohibited.

Another way hot water can be obtained during outdoor activity is to carry a vacuum insulated bottle. However, the disadvantage of carrying the vacuum insulated bottle, besides the inconvenience of carrying, is that the amount of hot water available is limited according to the size of the vacuum insulated bottle. Furthermore, the temperature of the water in the vacuum insulated bottle may lower as time goes on. Accordingly, hot water may not be available when needed.

SUMMARY OF THE INVENTION

One object of the present invention is to provide a portable hot water making bottle which heats water instantly. Another object is to provide a portable hot water making bottle which heats water in a short time using a portable heat source such as liquid propane gas.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Hereinafter, the present invention will be described in detail referring to several preferred embodiments with reference to the accompanying drawings.

Preferred Embodiment 1

Figure 2:
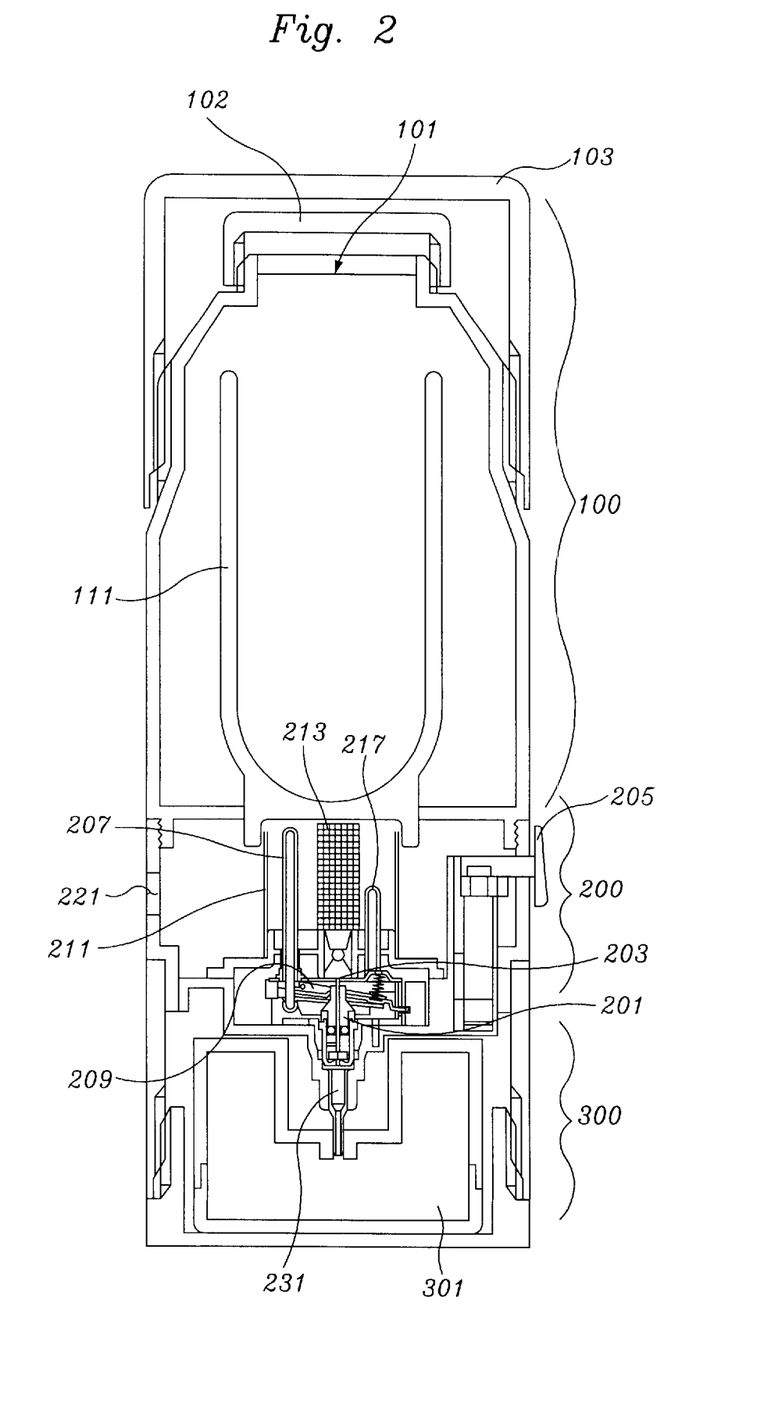
FIG. 2 is a cross-sectional view illustrating an example of a portable hot water making bottle according to the present invention.
Figure 3:
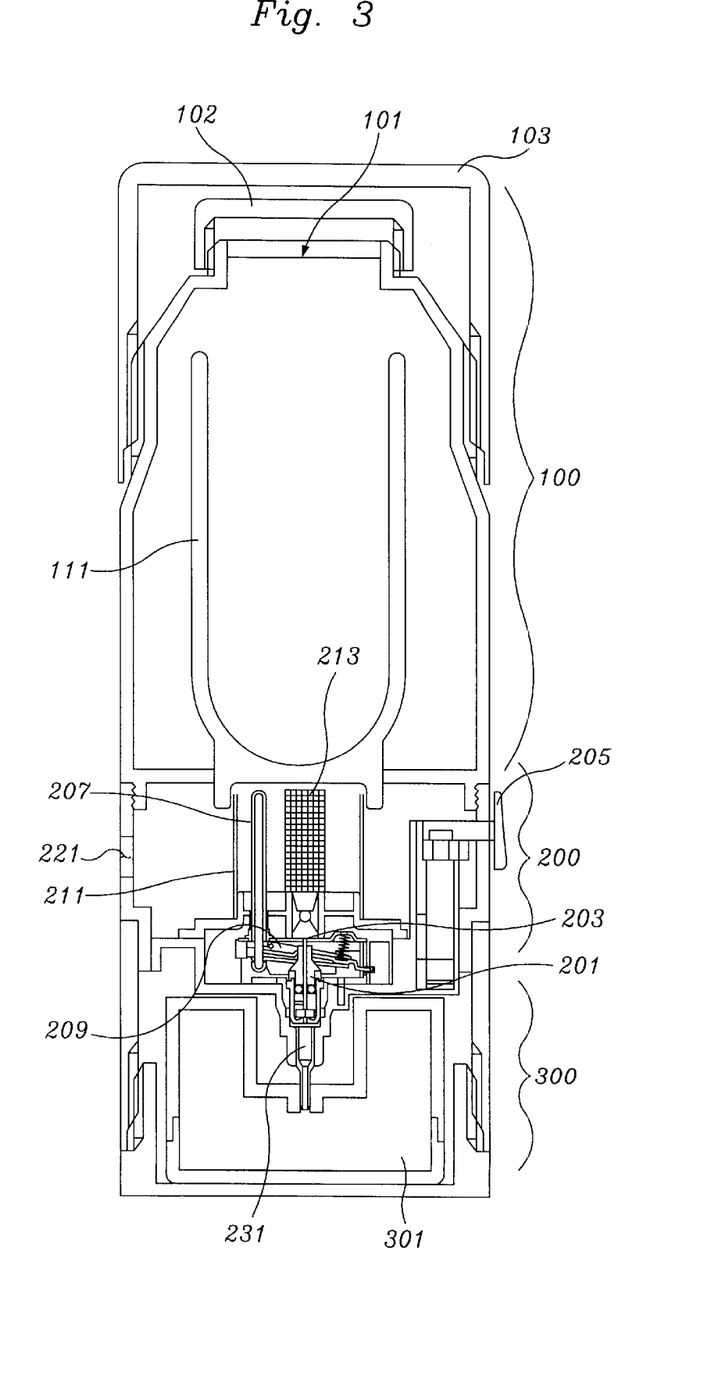
FIG. 3 is a cross-sectional view illustrating another example of a portable hot water making bottle according to the present invention.

FIG. 2 is a cross-sectional view showing an example of a portable hot water making bottle according to the present invention. The portable hot water making bottle may be of various sizes according to the amount of water to be contained. For example, the portable hot water making bottle may be of a small size containing 250 ml~500 ml of water, a medium size containing 500 ml~700 ml of water or a large size containing 500 ml~1500 ml of water. The hot water making bottle of the present may also be formed in various constructions such as a cylindrical construction similar to the conventional vacuum insulated bottle (see FIG. 1) or a kettle construction. The body of the portable hot water making bottle includes a water containing part 100, a heating part 200 which includes a heating device and a fuel containing part 300 in which fuel provided to the heating part 200 is contained.

The water containing part 100 has an opening portion 101 through which water flows in and out. The opening portion 101 can be narrow as illustrated in FIG. 2, or can be constructed with a wide opening similar to a known soup thermos. A cap 103 is included in the opening portion 101 in order to open and close the opening portion. The water containing part 100 is in a hollow cylindrical shape. A U-shaped heat pipe 111 is installed at the water containing part 100. The heat pipe 111 is formed to contact the water contained in the water containing part 100 by a maximum amount. One end of the heat pipe 111 is located in the water containing part 100 and the rest of the heat pipe is located in the heating part 200.

A heat source is installed in the heating part 200 and gas fuel such as liquid propane gas or butane gas is used as a heat source in the present invention. An ignition portion 203 is installed at the end of the nozzle 201 and an ignition button 205, which operates the ignition portion 203, is installed at the outer surface of the body of the portable hot water making bottle. The principle of operation of the ignition portion 203 and the nozzle 201 are the same as those in general turbo lighters. Accordingly, these elements have not been described in further detail. An ignition guide 211 forming an ignition space covers the nozzle 201 and the ignition portion 203. Flame formed at the end of the nozzle 201 directly contacts the end portion of the heat pipe 111 located in the heating part 200. The ignition guide 211 has a hollow cylindrical shape and is of mesh type formed with metal or insulation material. This prevents the flame from transmitting to adjacent parts of the bottle.

One end of a fuel pipe 231, which provides fuel, is connected to the nozzle 201, and the other end of the fuel pipe 231 is connected to a fuel containing part 300 which is located at the lower part of the heating part 200. A small fuel tank 301 is installed at the fuel containing part 300. When the small fuel tank 301 is mounted in the fuel containing part 300, one end of the fuel pipe 231 fits the outlet of the fuel tank 301. The fuel tank 301 can be changed into a new one after usage.

The fuel containing part 300 is secured to a bottom of the heating part 200. The connection between the fuel containing part 300 and the heating part 200 is a snap-fit connection; however, the connection can be a screw connection or other methods of connection readily understood by one having ordinary skill in the art.

The temperature of the water is adjusted by controlling the temperature of the heat pipe 111. Therefore, a thermal controller 207 such as bi-metal, which contacts the heat pipe 111 and a fuel control lever 209 that is connected to the nozzle at the fuel pipe 231 is installed in the heating part 200. The thermal controller 207 controls the fuel control level 209 to block the fuel pipe 231 in order to stop the fuel from flowing when the heat pipe 111 is heated up to a certain temperature. The heat source is turned off at the predetermined temperature. Furthermore, the oxygen needed for igniting the fuel should be supplied sufficiently to the heating part 200 through holes 221 formed in the case which allow outside air to flow into the ignition guide 211 easily.

The thermal controller 207 and the fuel control lever 209 have not been described further in detail, since they operate in the same manner as other heating devices that utilize gas fuel.

In addition, the heat energy of the heating part 200 should not contact the body of the portable hot water making bottle, since the heat might melt the material composing the portable hot water making bottle. Therefore, the thermal energy used in heating the liquid should be exposed outwards, and therefore it is preferable to form the air holes 221 around the body of the hot water making bottle to prevent excessive heat from contacting the body of the portable hot water making body directly.

Preferred Embodiment 2

According to the preferred embodiment 1, the heat pipe 111 is directly heated up by the flame that is made from burning gas fuel sprayed out from the nozzle 201 at the ignition portion 203. In such case, direct heat from the flame may over heat the nozzle 201 and the fuel pipe 231 which may cause an explosion or fire. Therefore, the second embodiment suggests a portable hot water making bottle using a low temperature thermal catalyst or thermal catalyst as a heat source, without making a flame. Although FIG. 2 illustrates a thermal catalyst 213, it should be noted that embodiment 1 would not include the catalyst 213, since as mentioned above, the flame contacts the heat pipe 111 directly. FIG. 2 has been used to illustrate both of embodiments 1 and 2 for the sake of simplicity. Embodiment 2 will now be described with reference to FIG. 2, wherein the catalyst 213 is included.

A low temperature thermal catalyst 213 of a meshed cylindrical sheet type is placed between the nozzle 201 and heat pipe 111. When the ignition button 205 is switched on, spark is formed at the ignition portion 203 and flame is made from burning the gas sprayed out from the nozzle 201. The low temperature thermal catalyst 213 is heated as the flame contacts the low temperature thermal catalyst directly. The nozzle 201 or the fuel pipe 231 is closed to eliminate the flame and the nozzle 201 or the fuel pipe 231 is re-opened without making any spark. The fuel is burned on the surface of the thermal catalyst 213 without making any flame and a bi-metal 217 can be used for controlling the flame. One end of the flame controlling bi-metal 217 is located on the fuel controlling lever 209. Once the flame is generated, the flame controlling bi-metal 217 is activated at a predetermined temperature. The flame controlling bi-metal 217 then operates the fuel controlling lever 209 to block the fuel from being supplied and the flame is eliminated. When the flame controlling bi-metal 217 is cooled down, the fuel providing lever 209 is operated again and only the fuel is supplied to the thermal catalyst 213. The fuel is then burned at the thermal catalyst 213 so that the thermal catalyst 213 becomes the heat source. Therefore, the thermal catalyst 213 should fully contact the heat pipe 111 in order to transmit the thermal energy of the heat source (or thermal catalyst 213) to the heat pipe 111 effectively.

Preferred Embodiment 3

Figure 4A:
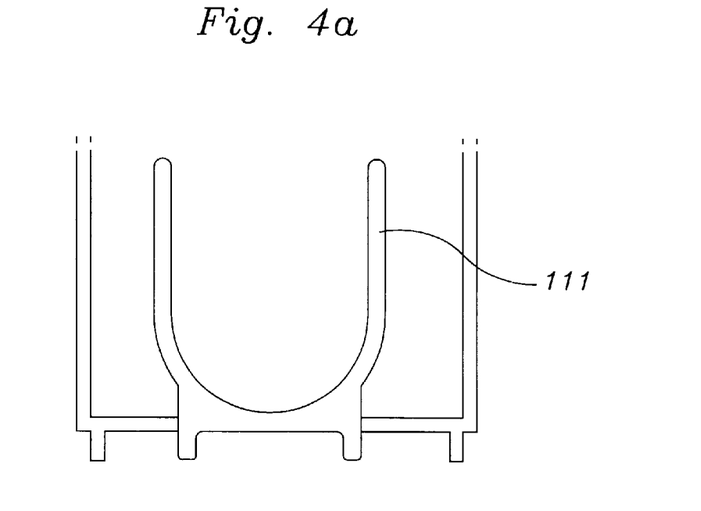
FIG. 4 shows several examples of the structure of a heat pipe applied to hot water making bottles according to the present invention.

In the third embodiment, various shapes of the heat pipe 111 will be explained. The heat pipe 111 should transmit the thermal energy from the heat source to the water effectively. Therefore, the heat pipe 111 should be designed with a certain shape such that the area of the heat pipe in contact with the water is maximized. As shown in FIG. 4a, it is preferable that the heat pipe 111 is of U-shape in cross-section like a bowl or cup and the volume of the heat pipe 111 is smaller than the volume of the water containing part 100. In addition, the interior and the exterior side of the heat pipe 111 should be in contact with the water to maximize the heating effect.

Figure 4B:
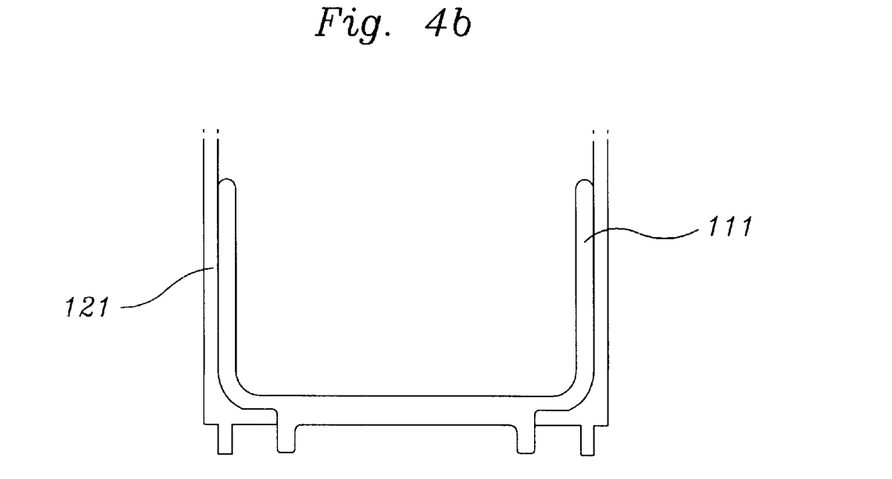
Figure 4C:
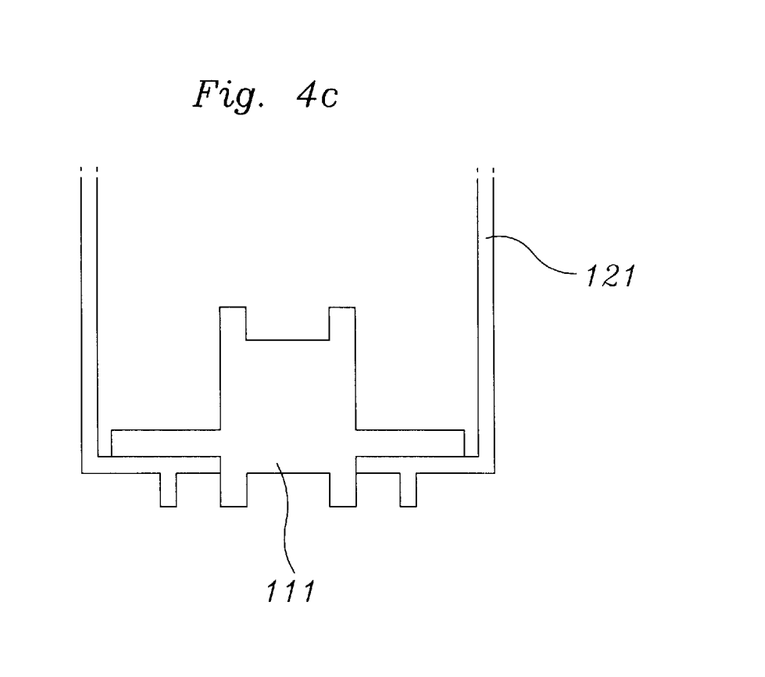
Figure 4D:
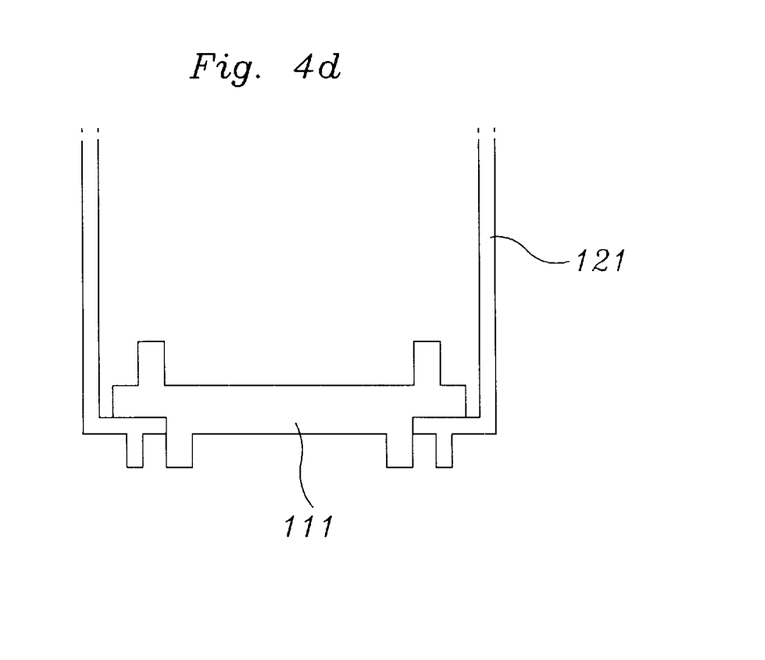
Figure 4E:
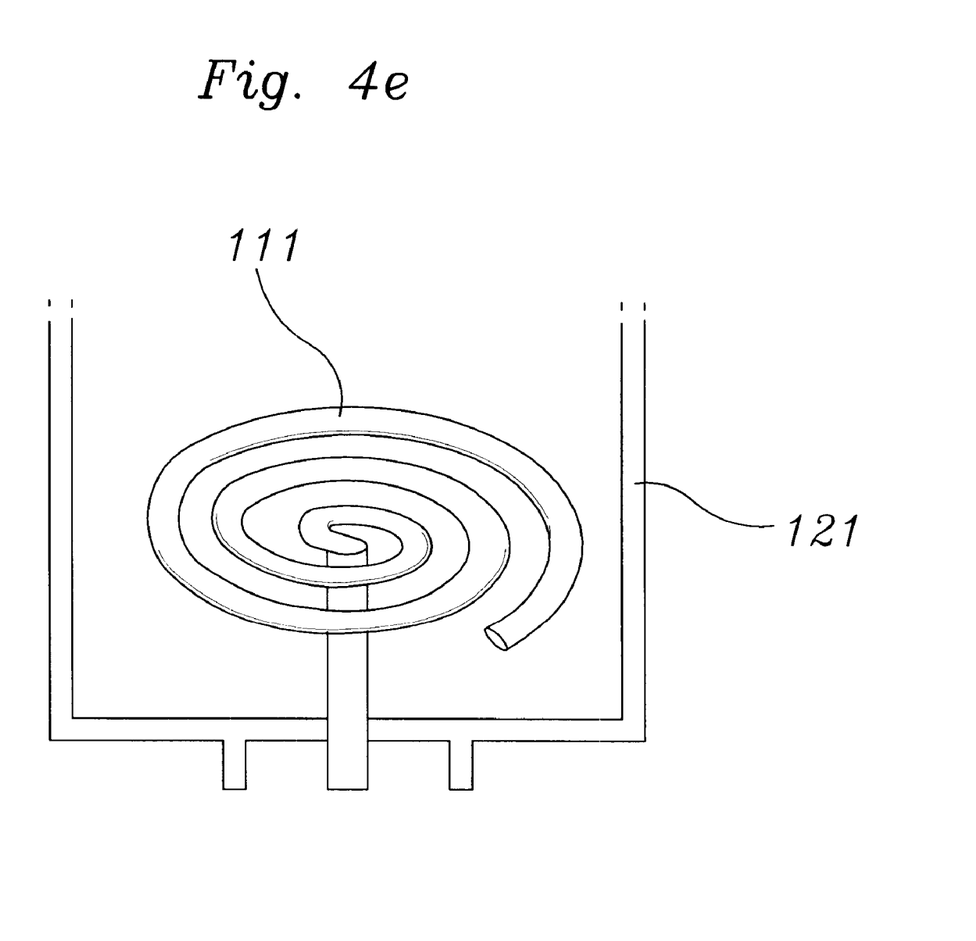

The heat pipe 111 can be made to have various shapes. It can be designed so that the inner surface of the water containing part 100 is in contact with water only, as shown in FIG. 4b. In this case, the thermal energy can be transmitted to the hands of a user directly. Accordingly, it is preferable to cover the outer surface of the heat pipe 111 with a heat insulation material 121. The heat pipe 111 shown in FIG. 4c is in a cylindrical shape, which is projected outwardly in the center. The heat pipe in FIG. 4d is in a disk shape like a thin plate in which the edge part is projected. The heat pipe 111 of the above two shapes can be used in situations such as preparing milk for babies where water needs to be heated up to only about 30 to 40 degrees centigrade. When applying the heat pipe 111 to products such as nursing bottles, the water can be heated sufficiently in a short time even if the area of the heat pipe 111 in contact with water is not large. The heat pipe 111 in FIG. 4e is in a spiral shape. In this case, the heat pipe 111 is thin enough to be bent and is formed on a plane surface.

Preferred Embodiment 4

Figure 5:
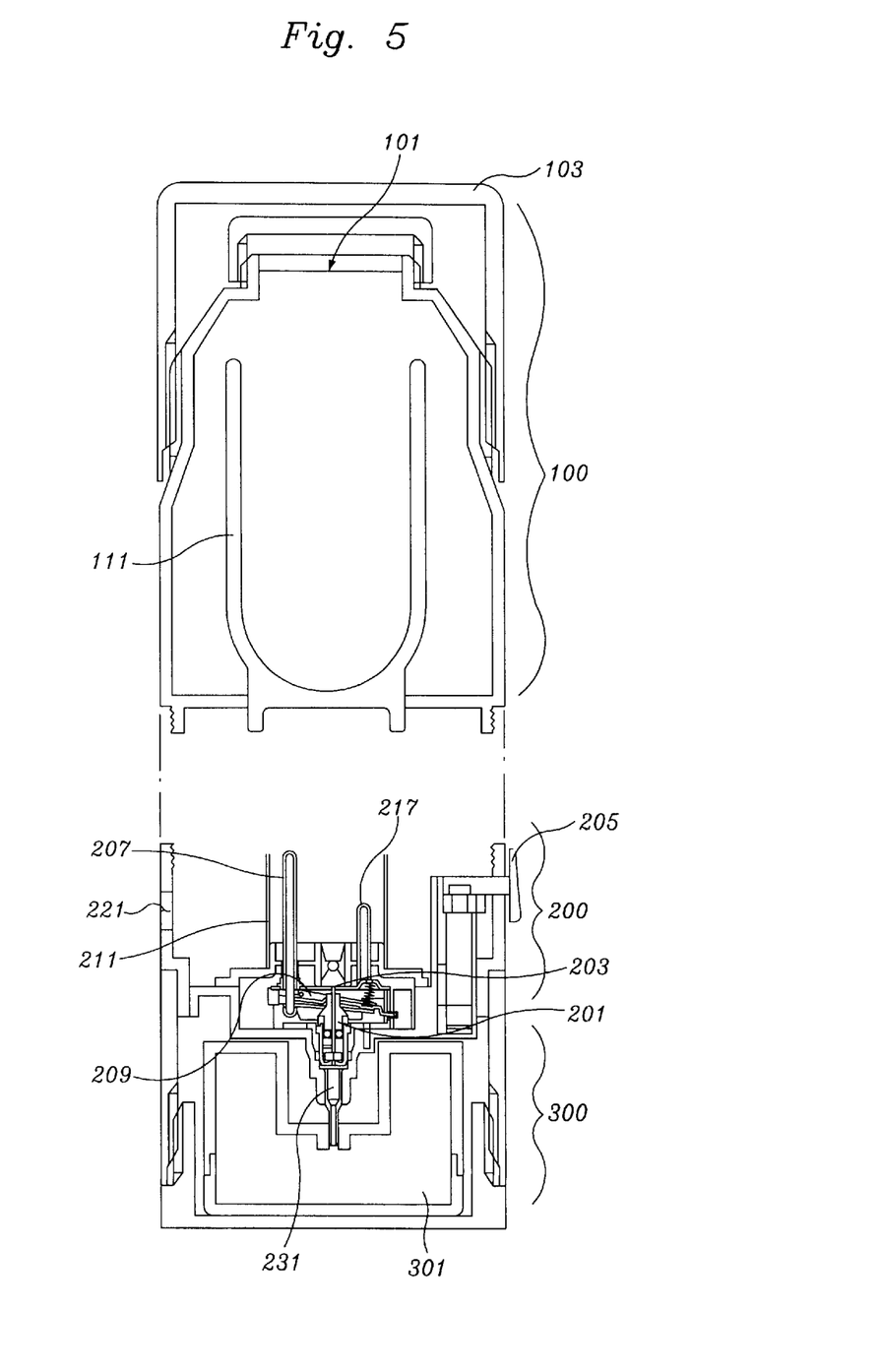
FIG. 5 is a cross-sectional view showing the structure of a portable hot water making bottle divided into a water containing device and a water heating device according to the present invention.

Previously, a portable hot water making bottle was considered in which the water containing part 100, the heating part 200 and the fuel containing part 300 are included in one body. For convenience purposes, the water containing part 100 can be formed in one body and the heating part 200 and the fuel containing part 300 can be formed in another body so that the two bodies can be joined and separated easily. By making the heating part 200 and the fuel containing part 300 separable from the water containing part, there is an advantage in that the replacement of the old part into a new part can be done easily. Another advantage is that it is safe and it can help prevent unexpected circumstances from happening since the heating part and the water containing part are separable after the contained water has been heated. Furthermore, with one set of the heating part 200, it is possible to use multiple sets of the water containing part 100 so it is cost effective. It should be noted that the heating part 200 and the water containing part 100 can be connected by a snap-fit or they can be threaded together.

Previous to the present invention, water was added to a vessel made of metal and a heat source was provided to the bottom surface of the vessel to make the water hot. When heating some kinds of material, especially water, a vessel and heat source of some kind is needed. According to the conventional concept and method, the object to be heated is held in a vessel and the heat source is a burner. The burner must have high thermal energy and the vessel must be made of a metal such as steel, stainless steel, copper, aluminum and the like, since metal transmits heat quickly. In order to achieve the maximum effect of making the water hot, the heat source has to be large enough and the surface of a vessel should contact the heat source by a maximum amount. Therefore, it was thought to be difficult to make a heat source sufficient to heat the water in the conventional apparatus.

The principle of the present invention is to get passed the traditional concept that the heat source has to be of a large volume to heat water. The main principle of the present invention is based on a heating device which has a heating source, and a vessel for holding the object to be heated. The present invention proves that it is possible to obtain hot water with a minimum heat source that is portable and effective. In the present invention, the volume of the heat source is minimized up to $1/1000$ (around 1~2 $cm^3$) of the volume of the vessel. The heat source is designed to make heat energy of high temperature and to have a minimum volume. In the case of applying this minimum heat source to the conventional method of heating water, it takes a long time to make a large volume of water hot even if the temperature of the heat source is over about 1000 degrees centigrade. This is due to the great heat loss of the heat source. The heat source in the present invention is made by providing energy from burning gas along with a low temperature catalyst. More specifically, almost any type of energy such as solid, liquid, vapor or electric can be used to make the heat source for the present invention.

In the present invention, a heat pipe is used to transmit the heat energy from a small volume heat source to a large volume of water in a short time. The heat pipe transmits the heat source to a heat receiving material, in this case, water, with a speed that is faster than or at least similar to that of sound. Accordingly, it is the most preferred heat transmitting device for realizing the principle of the present invention. In addition, the heat pipe is designed to transmit heat energy most effectively as shown in the preferred embodiment 3.

The present invention suggests a portable hot water making bottle in which a small water vessel and a small heating device are included in one body. In order to maximize the heating effect, the present invention uses a heat transmitting device such as a heat pipe and boils water in a short time. Therefore, users can obtain hot water whenever and wherever they want.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An instant portable hot liquid making bottle comprising:
    a liquid container, said liquid container including a cavity for containing liquid formed therein;
    a heat source at a bottom part of the liquid container; and
    a heat transmitting device installed in the liquid container, one end of said heat transmitting device contacting the heat source, and a second, opposite end of said heat transmitting device extending only partially into said cavity of said liquid container.

2. The instant portable hot liquid making bottle according to claim 1, further comprising:
    a fuel controlling device for controlling the supplying of fuel to the heat source; and
    an ignition device for burning the fuel supplied to the heat source.

3. The instant portable hot liquid making bottle according to claim 2, further comprising a temperature controller installed between the heat transmitting device and the fuel controlling device, said temperature controller stopping the supply of fuel when the heat transmitting device reaches a predetermined temperature.

4. The instant portable hot liquid making bottle according to claim 1, wherein the heat source includes a low temperature catalyst.

5. The instant portable hot liquid making bottle according to claim 4, wherein said low temperature catalyst is of mesh type.

6. An instant portable hot liquid making bottle, comprising:
    a liquid container;
    a heat source at a bottom part of the liquid container, said heat source including a low temperature catalyst; and
    a heat transmitting device installed in the liquid container, one end of said heat transmitting device contacting the heat source.

7. The instant portable hot liquid making bottle according to claim 6, wherein said low temperature catalyst is of mesh type.

8. The instant portable hot liquid making bottle according to claim 3, further comprising:
    a fuel controlling device for controlling the supplying of fuel to the heat source; and
    an ignition device for burning the fuel supplied to the heat source.

9. The instant portable hot liquid making bottle according to claim 8, further comprising a temperature controller installed between the heat transmitting device and the fuel controlling device, said temperature controller stopping the supply of fuel when the heat transmitting device reaches a predetermined temperature.

10. An instant portable hot liquid making bottle, comprising:
    a liquid container;
    a heat source at a bottom part of the liquid container;
    a heat transmitting device installed in the liquid container, one end of said heat transmitting device contacting the heat source;
    a fuel controlling device for controlling the supply of fuel to the heat source;
    an ignition device for burning the fuel supplied to the heat source; and
    a temperature controller installed between the heat transmitting device and the fuel controlling device, said temperature controller stopping the supply of fuel when the heat transmitting device reaches a predetermined temperature.

* * * * *